Feb. 14, 1961
T. E. SISNEROS ET AL
2,971,859
LUMINESCENT MATERIALS AND METHODS OF PREPARATION THEREOF
Filed June 30, 1958
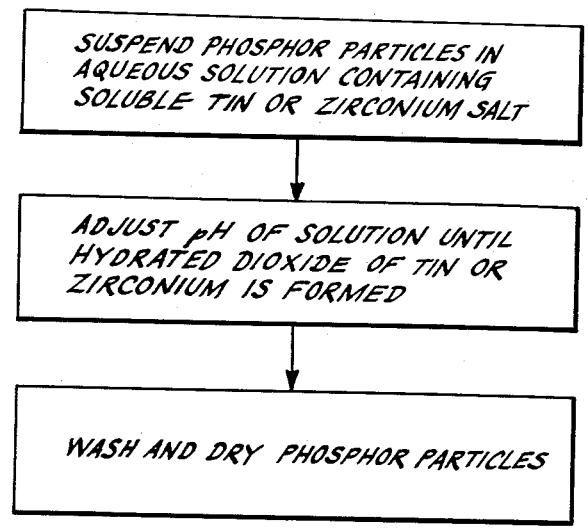
INVENTORS
THOMAS E. SISNEROS &
BY ROBERT T. WATSON
W.S. Hill
AGENT

United States Patent Office 2,971,859
Patented Feb. 14, 1961

2,971,859

LUMINESCENT MATERIALS AND METHODS OF PREPARATION THEREOF

Thomas E. Sisneros, Gas City, and Robert T. Watson, Marion, Ind., assignors to Radio Corporation of America, a corporation of Delaware Filed June 30, 1958, Ser. No. 745,294

11 Claims. (Cl. 117—33.5)

This invention relates to improved luminescent materials which may be used for making viewing screens for cathode ray tubes, luminescent lamps, kinescopes for television and the like. The invention relates also to improved methods for preparing the luminescent materials herein and to improved methods for preparing luminescent screens.

Luminescent screens may be produced by first preparing a suspension of phosphor particles in a liquid, and then settling the phosphor particles through the liquid onto a support for the screen. Subsequently, the supernatant liquid is decanted leaving a layer of phosphor particles on the support. Zinc sulfide and zinc-cadmium sulfide phosphors have long been used in this type of process for making luminescent viewing screens for cathode ray tubes. A mixture of two different phosphors may be used to produce a white-emitting viewing screen for television kinescopes. For example, a blue-emitting zinc sulfide with silver activator and a yellow-emitting zinc-cadmium sulfide with silver activator mixed in the proper proportions produces a white-emitting material. This is referred to as a P-4 type screen.

When forming luminescent screens by settling such phosphors from an aqueous suspension, certain difficulties are encountered. For example, there is a tendency for the layer of settled material to be disturbed during the removal of the supernatant liquid. Also, there is relatively poor adherence to the support while the material is wet, so that the material tends to avalanche if the support is not horizontal or has areas which are inclined to the horizontal, such as the curved edges of the face of the tube. The ability of the phosphor articles to remain in place after they are settled and before drying is referred to as the "wet adherence" of the phosphor.

Subsequent to drying, the back of the luminescent screen is aluminized. This is usually accomplished by coating the back of the phosphor layer with an organic film, and then evaporating aluminum thereon. Filming and aluminizing strains the phosphor layer, frequently causing the layer to rupture and to tear. Rupturing and tearing during filming and aluminizing may be avoided by improved adherence of the layer to its support. The ability of the phosphor particles to remain in place after they have been settled and dried is referred to as the "dry adherence" or the "filming adherence" of the material.

It is known that the wet adherence of the phosphor may be improved by coating the individual particles thereon with calcium hydroxyphosphate. This coating may be produced by suspending the phosphor particles in an aqueous medium containing a soluble phosphate and soluble calcium salt, adjusting the pH in the range between 10.5 and 11.0, and then washing and drying the phosphor particles. Subsequently, the coated phosphor particles are again suspended in an aqueous medium and settled upon the face of the cathode ray tube or other support as described above. While such coatings are successful, nevertheless, a further improvement in the wet adherence of the phosphor is desirable. Very little has been taught as to filming adherence, and an improvement of this characteristic is also desirable.

An object of the invention is to provide luminescent materials having improved wet adherence and improved filming adherence.

A further object is to provide improved methods for treating phosphor particles to improve both the wet adherence and the filming adherence characteristic thereof.

Another object is to provide improved methods for preparing luminescent screens for cathode ray tubes.

The improved luminescent materials herein comprise finely-divided phosphor particles, each particle having a thin coating of a material selected from the group consisting of tin dioxide and zirconium dioxide. By virtue of the particular coating, the phosphor particles exhibit improved wet adherence and improved filming adherence characteristics in subsequent screen-making processes.

The improved luminescent materials herein may be prepared by coating particles of phosphor, such as silver-activated zinc or zinc-cadmium sulfide, with a thin layer of tin dioxide or zirconium dioxide. A preferred method comprises suspending the phosphor particles in an aqueous medium containing a soluble tin or zirconium salt, such as tin tetrachloride or zirconyl nitrate, adjusting the pH in the range of 2.5 to 11.0 with a soluble base, such as potassium hydroxide, and then washing and drying the phosphor particles.

The sole figure is a flow sheet chart illustrating typical steps in the improved process of the invention.

*Example 1.*—A preferred procedure for coating blue-emitting zinc sulfide particles with tin dioxide will now be described. Slurry 500 grams of the phosphor with 1500 ml. of demineralized water. A suitable blue-emitting zinc sulfide is prepared by firing an intimate mixture of 100 grams zinc sulfide, 0.011 gram silver as silver chloride, 2.0 grams magnesium chloride, 2.0 grams ammonium chloride, and 0.5 gram trisodium phosphate at about 980° C. in a covered beaker for about 45 minutes. To this slurry add in order:

(a) A solution containing 1.165 grams tin tetrachloride as the pentahydrate in 50 ml. demineralized water. The slurry is then stirred for several minutes.

(b) A solution of 0.2 N potassium hydroxide until a pH of 7.0 is obtained. This latter solution is added slowly to the slurry while maintaining vigorous stirring.

At this point, hydrated tin dioxide is precipitated upon the phosphor particles forming a thin coating thereon. The coated phosphor particles are washed twice on a filter funnel with 1000 ml. portions of demineralized water and then dried over night at 120° C. At this point, the coating has been converted from hydrated tin dioxide to tin dioxide. The dried product is sieved through 200 mesh prior to use.

The product comprises dried phosphor particles having a thin coating of tin dioxide thereon. The tin dioxide comprises about 0.1 weight percent of the weight of phosphor. The product is similar in characteristics to the conventional product except that the wet adherence is increased by about 40% and the filming adherence is increased by about 200%. The conventional product used for comparison is silver-activated zinc sulfide particles having a calcium hydroxyphosphate coating thereon.

*Example 2.*—A preferred procedure for coating blue-emitting zinc sulfide particles with zirconium dioxide will now be described. Follow the procedure of Example 1 except substitute 1.08 grams zirconyl nitrate dihydrate for tin tetrachloride. The product comprises dry phosphor particles having a thin coating of zirconium dioxide thereon. The product is similar in characteristics to the product of Example 1.

*Reagents.*—Any soluble tin salt such as tin nitrate, tin acetate, or tin iodide may be used in place of tin tetrachloride. Similarly, any soluble zirconium salt, such as zirconium sulfate, zirconium acetate, or zirconyl chloride may be used in place of zirconyl nitrate dihydrate.

Any method of obtaining the proper pH for precipitation may be used. Sodium hydroxide, sodium carbonate, urea, calcium hydroxide, and lithium hydroxide may be used in place of potassium hydroxide. Some bases are more preferable for obtaining desirable pH. Urea allows more uniform control of reaction because reaction will not take place locally (as with KOH) when urea is first added. Only after the temperature is raised does the pH change with urea. The pH changes more slowly and more uniformly throughout the solution with urea yielding a smoother coating of the particles. The pH may be adjusted to any value within the range of 2.5 to 11.0. A pH of about 7.0 is convenient and preferred.

*Phosphors.*—The process is equally effective for coating other phosphors. The steps of the examples may be carried out on silver-activated zinc-cadmium sulfide phosphors to obtain similar results. Concentration can vary from very low, say 0.001%, up to 2.0 weight percent of coating with respect to the weight of phosphor.

*Wet adherence test.*—A luminescent screen is prepared by settling from an aqueous medium upon a 400 ml. beaker bottom. Two by two inch glass plates may also be used. Three hundred ml. of "cushion" is dispensed into each beaker. The cushion consists of 224 ml. barium acetate solution having a concentration of 8.67 grams per liter in 6276 ml. water for one test run of 21 beakers. Then, 50 ml. of phosphor suspension are dispensed into each beaker using an inverted 50 ml. pipette with a stainless steel underwater spray nozzle. The phosphor suspension is prepared as follows: (1) for standard phosphor only, three grams of the phosphor is stirred for one minute in 100 ml. dilute potassium silicate solution and 600 ml. water; (2) for test phosphors, three grams of the phosphor is stirred for 59 minutes in 600 ml. water, and then for one additional minute after addition of 100 ml. silicate. The phosphor is allowed to settle for 20 minutes, at which time the beakers are transferred to the jet impingement unit for test.

The wet adherence is tested by jet impingement. A stream of tap water is squirted at the screen through the settling solution to erode a hole in the screen. The tap water passes through a 1.2 mm. capillary tube nozzle placed one inch above the beaker platform. The water head is adjusted to result in a flow rate through this nozzle of $153 \pm 2$ ml. per minute. The diameters of the eroded holes are measured in cm. and are averaged for the three beakers run on each sample.

*Calculations.*—The hole diameter itself is a satisfactory expression of wet adherence. However, to compare with former data, the hole diameter is converted to the "wet adherence unit" by the following means: Wet adherence = $8.21/\text{diam}.^2$. The "wet adherence unit" is the reciprocal of the hole area in square inches, the 8.21 being the conversion factor. The wet adherence unit is converted into "relative wet adherence" as follows: Relative Wet Adherence of the test phosphor—W.A. test/W.A. Std. $\times 4.05$, the "relative wet adherence" of the present standard being 4.05. Expressing the results in terms of relative wet adherence, or "adherence relative to the standard" tends to eliminate small day-to-day test fluctuations.

*Filming adherence test.*—A luminescent screen is prepared by settling from an aqueous medium upon the face plate of a 21" 90° bulb. A cushion, consisting of 770 cc. a solution containing 8.67 grams barium acetate per liter and 17,000 cc. cold demineralized water is dispensed into the bulb on a pouroff table. Next, a silicate solution, consisting of 1145 cc. dilute potassium silicate and 1000 cc. water, is dispensed through a funnel and metal composite nozzle. Exactly 5 minutes later, the phosphor suspension, consisting of 6.875 grams of phosphor in 500 cc. water, is dispensed through a funnel and a SS-18 plastic nozzle. Settling time is 30 minutes, pouroff rate subsequent to settling is 6 to 7 minutes per 180°. Exactly 15 minutes after the start of pouroff, the air driers are turned on to 17 p.s.i.g. and the screens allowed to dry. The first spot to dry (should take slightly over 2 minutes) is marked and the test is performed in this region.

The "dry" or "filming" adherence is tested by jet impingement. The screen is rewetted gently on the barrel rinse position. Exactly three minutes later, water at 40 p.s.i.g. is sprayed at the test area on the screen through a 0° deflection one gallon per minute nozzle (Spraying Systems Co., No. 0010). The timing of this water spray is 3 seconds on, 2 seconds off, for a total of four times. The diameters of the eroded holes are measured in cm., averaged, and reported as "filming adherence."

EXAMPLES OF COATING PROCEDURES USED

I. 0.1% $SnO_2$—*urea precipitation method*

(1) Slurry 100 g. of chloride-free phosphor with 300 ml. demineralized $H_2O$.

(2) Add 1 ml. of $SnCl_4$ solution which contains 0.233 g. of $SnCl_4 \cdot 5H_2O$ per ml.

(3) Adjust pH to 2.0 or below with HCl (this is not absolutely necessary but gives more uniform results by redissolving any precipitated material and giving uniform starting point).

(4) Dissolve 10 g. of urea in 25 ml. demineralized $H_2O$ and add to slurry.

(5) Stir and boil until pH is above 6.0.

(6) Filter and wash with demineralized $H_2O$ until chloride-free.

(7) Dry overnight in 120° C. oven.

II. 1% $SnO_2$—*KOH precipitation method*

(1) Slurry 100 g. of chloride-free phosphor with 300 ml. demineralized $H_2O$.

(2) Dissolve 2.33 g. of $SnCl_4 \cdot 5H_2O$ in 50 ml. demineralized $H_2O$ and add to slurry.

(3) Add KOH to raise pH to 7.0.

(4) Filter and wash with demineralized $H_2O$ until chloride-free.

(5) Dry overnight in 120° C. oven.

III. $SnO_2$—$H_2O$ *precipitation method*

(1) Slurry 100 g. of chloride-free phosphor with 300 ml. demineralized $H_2O$.

(2) Add $SnCl_4$ solution containing 0.233 g. of $SnCl_4 \cdot 5H_2O$ per ml. Use 1.0 ml. of this solution for each 0.1% $SnO_2$ desired.

(3) Dilute with demineralized $H_2O$ until pH is above 3.5. Due to container size limitation, some of $H_2O$ may have to be decanted before adding fresh $H_2O$; however, this results in loss of some unprecipitated Sn and gives lower than theoretical $SnO_2$ concentration.

(4) Filter and wash with demineralized $H_2O$ until chloride-free.

(5) Dry overnight in 120° C. oven.

IV. 0.1% $ZrO_2$—*KOH precipitation method*

(1) Slurry 100 g. of chloride-free phosphor with 300 ml. demineralized $H_2O$.

(2) Dissolve 0.216 g. of $ZrO(NO_3)_2 \cdot 2H_2O$ in 10 ml. demineralized $H_2O$ and add to slurry.

(3) Add KOH to raise pH to 7.0.

(4) Filter and wash with demineralized $H_2O$—a total of 1 liter of $H_2O$ should give sufficient washing.

(5) Dry overnight in 120° C. oven.

V. 0.1% $ZrO_2$—*urea precipitation method*

(1) Slurry 100 g. of chloride-free phosphor with 300 ml. demineralized $H_2O$.

(2) Dissolve 0.216 g. of $ZrO(NO_3)_2 \cdot 2H_2O$ in 10 ml. demineralized $H_2O$ and add to slurry.

(3) Adjust pH to 2.0 or below with HCl.

(4) Dissolve 10 g. of urea in 25 ml. demineralized $H_2O$ and add to slurry.
(5) Stir and boil until pH is above 6.0.
(6) Filter and wash with 1 liter of demineralized $H_2O$.
(7) Dry overnight in 120° C. oven.

VI. 0.1% $ZrO_2$—$H_2O$ *precipitation method* [1]

(1) Slurry 100 g. of chloride-free phosphor with 300 ml. demineralized $H_2O$.
(2) Dissolve 0.216 g. of $ZrO(NO_3)_2 \cdot 2H_2O$ in 10 ml. demineralized $H_2O$ and add to slurry.
(3) Filter and wash with 1 liter of demineralized $H_2O$.
(4) Dry overnight in 120° C. oven.

VII. 0.1% $TiO_2$—KOH *precipitation method*

(1) Slurry 100 g. of washed phosphor with 300 ml. demineralized $H_2O$.
(2) Add 0.238 g. (0.138 ml.) of $TiCl_4$ to the slurry.
(3) Adjust pH to 7.0 by adding KOH.
(4) Filter and wash with demineralized $H_2O$ until chloride free.
(5) Dry overnight in a 120° C. oven.

VIII. 0.5% $Li_2SiO_3$ and 0.5% $SnO_2$—KOH *precipitation method*

(1) Slurry 100 g. of washed phosphor with 300 ml. demineralized $H_2O$.
(2) Dissolve 0.705 g. of LiCl in 10 ml. demineralized $H_2O$ and add to slurry.
(3) Add 21.4 ml. of a potassium silicate solution containing 0.0233 g. $SiO_2$/ml. to the slurry.
(4) Adjust pH to 10.0 by adding 0.2 N KOH.
(5) Filter and reslurry with 300 ml. demineralized $H_2O$.
(6) Follow coating procedure for 0.5% $SnO_2$.

IX. 1% $Mg(BO_2)_2$ (1) Slurry 100 g. of washed phosphor with 250 ml. of 2.0 M $NaBO_2$ solution.
(2) Add 36.4 ml. of 0.25 M $MgCl_2$ solution.
(3) Filter and wash with demineralized $H_2O$ until chloride-free.
(4) Dry overnight in a 120° C. oven.

X. 0.5% $SiO_2$—KOH *precipitation method*

(1) Slurry 100 g. of washed phosphor with 300 ml. demineralized $H_2O$.
(2) Add 1.415 g. (0.943 ml.) of $SiCl_4$ to the slurry.

[1] This can be used for small concentrations of $ZrO_2$ where the addition of $ZrO(NO_3)_2$ will not reduce pH below 3.0.

(3) Adjust the pH to 10.0 by adding KOH.
(4) Filter and wash with demineralized $H_2O$ until chloride-free.
(5) Dry overnight in a 120° C. oven.

XI. 0.1% $Al_2O_3$ and 1% $SnO_2$—KOH *precipitation method*

(1) Slurry 100 g. of washed phosphor with 300 ml. demineralized $H_2O$.
(2) Dissolve 0.368 g. of $Al(NO_3)_3 \cdot 9H_2O$ in 10 ml. demineralized $H_2O$ and add to slurry.
(3) Adjust pH to 7.0 with KOH.
(4) Filter and reslurry with 300 ml. demineralized $H_2O$.
(5) Follow coating procedure for 1% $SnO_2$.

TABLE OF ADHERENCES

| Coating | Coating Technique | ZnS | ZnCdS | ZnS+ZnCdS | Batch Size, Grams | Relative Wet Adherence | Filming Adherence Hole Size |
|---|---|---|---|---|---|---|---|
| Ca hydroxy-phosphate | | Reference | | | | 2.2 | 2.5 |
| $SnO_2$ | I. Urea | 1300-1G4 | | | 68 | 3.5 | 1.0 |
| $SnO_2$ | II. KOH | CR5 | | | 100 | 3.1 | |
| $SnO_2$ | III. $H_2O$ | 1275G5F | | | 1,359 | 3.0 | 0.97 |
| $SnO_2$ | III. $H_2O$ | 1310B | | | 34,500 | 2.8 | 1.0 |
| $ZrO_2$ | V. Urea | 1300-1AZrU | | | 66 | 3.1 | 0.90 |
| $ZrO_2$ | IV. KOH | 1300-2Zr | | | 100 | 3.0 | 1.1 |
| $ZrO_2$ | VI. $H_2O$ | 1300-2ZrA | | | | 3.1 | 1.2 |
| $TiO_2$ | VII. KOH | 1300-2TiA | | | 100 | 3.3 | 1.1 |
| Ca hydroxy-phosphate | | | Reference | | | 3.3 | 1.9 |
| $SnO_2$ | I. Urea | | YU2 | | 100 | 4.4 | 1.2 |
| $SnO_2$ | II. KOH | | CR4 | | 100 | 4.1 | |
| $SnO_2$ | II. KOH | | CR4E1 | | 100 | 4.1 | 0.70 |
| $ZrO_2$ | IV. KOH | | 2289Zr | | 100 | 4.1 | 0.80 |
| $ZrO_2$ | IV. KOH | | 2321B9Zr2 | | 60 | 4.1 | 0.80 |
| $LiSiO_3$ and $SnO_2$ | VIII. KOH | | CR22 | | 100 | 4.1 | 0.95 |
| $Mg(BO_2)_2$ | IX. | | CR1 | | 100 | 4.0 | 0.90 |
| Ca hydroxy-phosphate | | | | Reference | | 3.0 | 2.2 |
| $SnO_2$ | II. KOH | | | CR4 and CR5 | 200 | 3.9 | 0.80 |
| $Al_2O_3$ and $SnO_2$ | XI. KOH | | | CR3 and CR6 | 200 | 4.3 | 0.81 |
| $Al_2O_3$ and $SnO_2$ | XI. KOH | | | CR39 and CR40 | 200 | 4.3 | 0.93 |
| $SiO_2$ | X. KOH | | | CR11 and CR12 | 200 | 3.6 | 1.0 |
| $Li_2SiO_3$ and $SnO_2$ | VIII. KOH | | | CR22 and CR28 | 200 | 3.2 | 1.1 |
| $Mg(BO_2)_2$ | IX. | | | CR1 and CR8 | 200 | 3.0 | 1.0 |

What is claimed is:

1. A luminescent material comprising finely-divided phosphor particles selected from the group consisting of zinc sulfides and zinc cadmium sulfides, each particle having a thin coating of a material selected from the group consisting of tin dioxide and zirconium dioxide, said coating being 0.001 to 2.0 weight percent of the weight of said phosphor.

2. A luminescent material comprising finely-divided phosphor particles selected from the group consisting of zinc sulfides and zinc cadmium sulfides, each particle having a thin coating of tin dioxide, said coating being 0.001 to 2.0 weight percent of the weight of said phosphor.

3. A luminescent material comprising finely-divided phosphor particles selected from the group consisting of zinc sulfides and zinc cadmium sulfides, each particle having a thin coating of zirconium dioxide, said coating being 0.001 to 2.0 weight percent of weight of said phosphor.

4. A luminescent material comprising finely-divided phosphor particles selected from the group consisting of silver-activated zinc sulfide and silver-activated zinc cadmium sulfide, each particle having a thin coating of a material selected from the group consisting of tin dioxide and zirconium dioxide, said coating being 0.001 to 2.0 weight percent of the weight of said phosphor.

5. A luminescent material comprising finely-divided silver-activated zinc sulfide particles, each particle having a thin coating of tin dioxide, said coating being 0.001 to 2.0 weight percent of the weight of said phosphor.

6. A luminescent material comprising finely-divided silver-activated zinc sulfide particles, each particle having a thin coating of zirconium dioxide, said coating being 0.001 to 2.0 weight percent of the weight of said phosphor.

7. A method for coating phosphor particles selected from the group consisting of zinc sulfides and zinc cadmium sulfides comprising suspending said particles in an aqueous medium containing a soluble salt of a metal selected from the group consisting of tin salts and zirconium salts, adjusting the pH so that a hydrated dioxide of said metal is formed washing the phosphor particles, and then drying the washed particles, thereby producing phosphor particles coated with a material selected from a group consisting of tin dioxide and zirconium dioxide, said coating being 0.001 to 2.0 weight percent of the weight of said phosphor.

8. A method for coating phosphor particles selected from the group consisting of zinc sulfides and zinc cadmium sulfides, said coating being 0.001 to 2.0 weight percent of the weight of said phosphor comprising suspending said particles in an aqueous medium, adding a solution of a soluble zirconium salt to said suspension, adjusting the pH of said suspension to a value in the range between 2.5 and 11.0, washing the phosphor particles and then drying the washed particles.

9. A method for coating phosphor particles selected from the group consisting of zinc sulfides and zinc cadmium sulfides, said coating being 0.001 to 2.0 weight percent of the weight of said phosphor comprising suspending said particles in an aqueous medium, adding a solution of a soluble tin salt to said suspension, adjusting the pH of said suspension to a value in the range between 2.5 and 11.0, washing the phosphor particles and then drying the washed particles.

10. In a method for preparing a luminescent material, the step comprising coating individual phosphor particles selected from the group consisting of zinc sulfides and zinc cadmium sulfides with a thin layer of tin dioxide while suspended in an aqueous medium having a pH between 2.5 and 11.0, said coating being 0.001 to 2.0 weight percent of the weight of said phosphor.

11. In a method for preparing a luminescent material, the step comprising coating individual phosphor particles selected from the group consisting of zinc sulfides and zinc cadmium sulfides with a thin layer of zirconium dioxide while suspended in an aqueous medium having a pH between 2.5 and 11.0, said coating being 0.001 to 2.0 weight percent of the weight of said phosphor.

References Cited in the file of this patent

UNITED STATES PATENTS

| | | |
|---|---|---|
| 2,634,217 | Sanabria | Apr. 7, 1953 |
| 2,817,599 | Edwards | Dec. 24, 1957 |
| 2,828,217 | Levin | Mar. 25, 1958 |